United States Patent Office 3,529,711
Patented Sept. 22, 1970

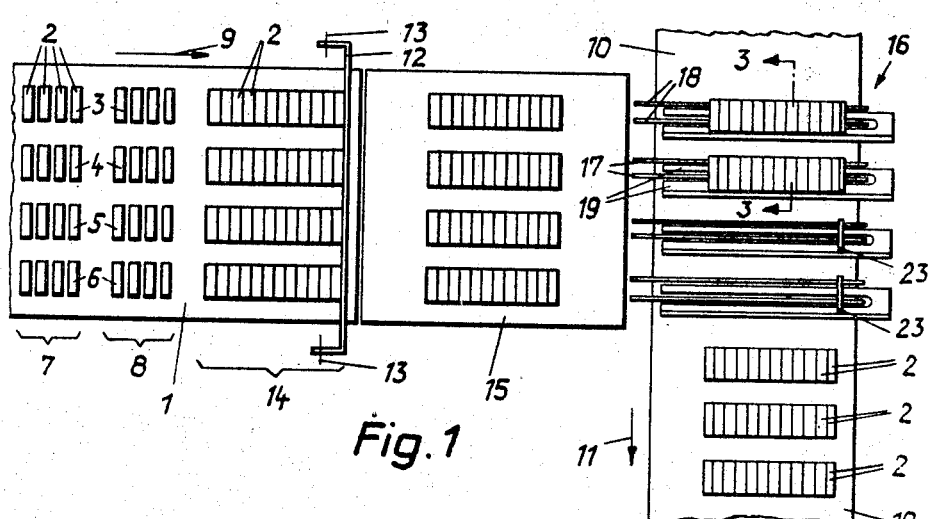
Fig.1
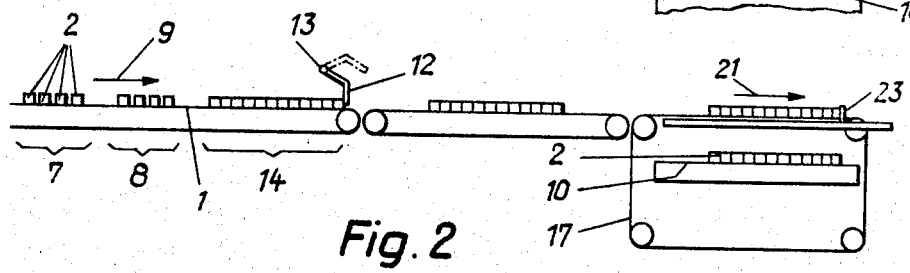
Fig.2
Fig.3
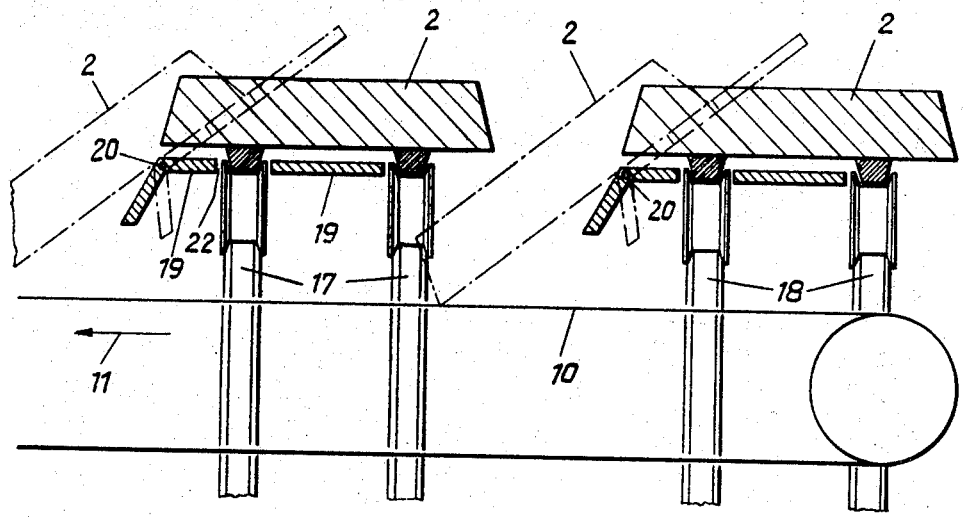
INVENTOR
KURT MOELLER

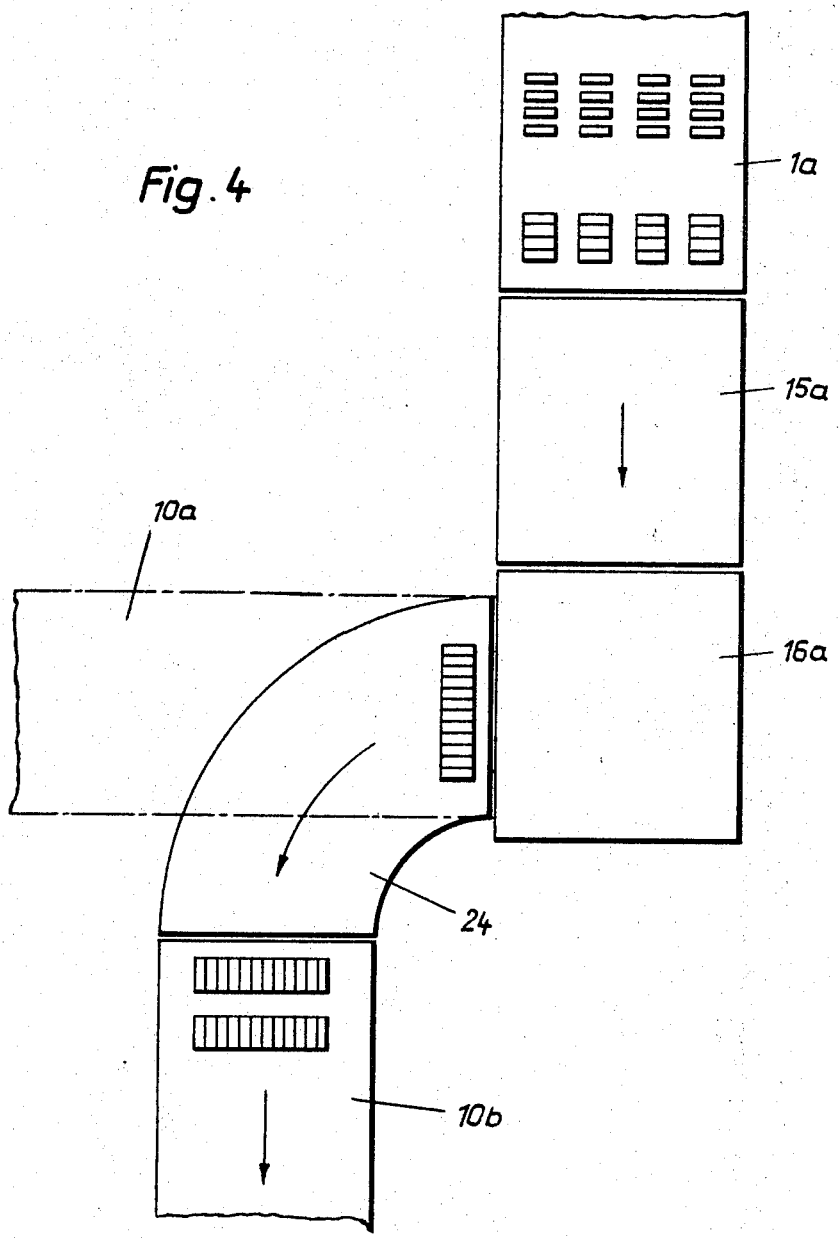

3,529,711
DEVICE FOR TRANSFERRING FLAT ARTICLES OF GENERAL RECTANGULAR SHAPE FROM ONE LINEAL CONVEYOR TO A SECOND ONE
Kurt Moeller, Renens, Switzerland, assignor to "Sapal" Societe Anonyme des Plieuses Automatiques, Ecublens, Switzerland, a Swiss company
Filed Nov. 1, 1968, Ser. No. 772,772
Claims priority, application Switzerland, Nov. 10, 1967, 15,702/67
Int. Cl. B65b *35/30;* B65g *47/26*
U.S. Cl. 198—34             4 Claims

ABSTRACT OF THE DISCLOSURE

This invention refers to a device for transferring flat articles of general rectangular shape, from a first linear conveyor on to a second one, where, on the first, these articles are spaced apart and placed parallel to each other in the form of several longitudinal rows with their small sides parallel to the direction of movement, whereas on the second conveyor, these articles have their long sides parallel to the direction of movement of said second conveyor.

---

In automatic installations for the manufacture and packing of flat articles of general rectangular shape, such as chocolate slabs, the problem arises of transferring from a first lineal conveyor to a second one the articles in question, in the following conditions: on the first conveyor, these articles arrive from the moulding machines and are spaced apart and placed parallel one to the other in several longitudinal rows with their small sides parallel to the direction of movement. On the other hand on the second lineal conveyor, it is necessary that the articles should, after transfer, have their long sides parallel to the direction of movement of said second conveyor. Up to now no solution is known which permits of automatically ensuring such a transfer, the main difficulty arising from the extremely rapid speed of the installations in question, so much so that up to the present one has met with insurmountable difficulties in carrying out this transfer mechanically in the very short lapse of time available. This lapse of time corresponded as a matter of fact to the distance separating two articles one from the other on the first conveyor, a very short distance itself corresponding to a very short time.

The present invention aims at providing a solution to this problem and it has for object a device for transferring flat articles of general rectangular shape, such as chocolate slabs, from a first lineal conveyor on to a second one, where, on the first, these articles are spaced apart and placed parallel one to the other in several longitudinal rows and with their small sides parallel to the direction of movement, whereas on the second conveyor these articles have their long sides parallel to the direction of movement of said second conveyor.

The device according to the invention is characterized in that it comprises, on the one hand, a temporary stopping means for the articles situated on the first conveyor, to oblige the articles of each row to huddle together to form a compact group, and in that it comprises, on the other hand, a means for raising individually each of these groups above the first conveyor and then to cause it to slip on to the second, parallel to the longitudinal direction of said articles.

The accompanying drawing shows, very diagrammatically, by way of example, one embodiment and a variant of the device according to the invention.

FIG. 1 is a partial plan view of said embodiment.
FIG. 2 is a lateral view corresponding to FIG. 1.
FIG. 3 is a partial sectional view on a larger scale, along 3—3 of FIG. 1.
FIG. 4 is a plan view corresponding to FIG. 1, but relative to a variant.

In FIG. 1, there is shown in plan view a first lineal conveyor constituted by an endless belt on which are periodically distributed flat articles such as chocolate slabs, of general rectangular shape, designated in a general manner by 2. These articles are placed on the conveyor 1, by the outlet members of a moulding machine not shown, in the form of several longitudinal rows, 3, 4, 5, 6. In each row the articles 2 are disposed by groups such as 7 and 8 (in the example these groups are each of four articles). The small sides of these articles are parallel to the direction of the arrow 9 which is that of the movement of the conveyor 1. In FIG. 1, there is also to be seen a second conveyor 10 also constituted by an endless belt, but which is disposed perpendicularly to the first conveyor 1. The arrow 11 indicates the direction of movement of the second conveyor 10. The device is conceived, as will be seen later on, so as to ensure the transfer of the articles 2 from the conveyor 1 to the conveyor 10 in such a way that on said second conveyor these articles are disposed no longer with their small sides, but their long sides parallel to the direction of movement 11 of said conveyor 10. As a matter of fact, this latter orientation is necessary for the feeding of the distributing members and the automatic folding machine or machines to which the device brings the objects to be packed.

A stop bar 12 pivoting about an axis 13 is provided at the forward end of the conveyor 1 as is seen in FIGS. 1 and 2. This bar 12 is controlled in synchronism with the general operations of the installation so as to oscillate according to a definite rhythm between the position shown in full lines in FIG. 2 (working position) and that shown in dot and dash lines (idle position). In the working position, the bar 12 is in the immediate vicinity of the conveyor 1 and the articles 2 which are in the fore part of said conveyor strike against the bar 12. These articles no longer being able to advance are obliged due to the movement of the conveyor 1 to huddle together so as to form in each row 3, 4, 5, 6 a compact group such as indicated by 14. Of course, during this huddling operation on the one hand against the bar 12 and on the other hand the one against the other, the conveyor slides under these articles. When the bar 12 rises, the four groups 14 are driven by the conveyor 1 and are transferred to an intermediate conveyor 15 which will be described further on. Once this transfer has taken place, the bar 12 resumes its operative position to act as has just been described on the articles which follow and are still spaced apart. If one considers FIGS. 1 and 2, it will be seen that each group of articles in a row 3, 4, 5, 6 is formed of four articles. On the other hand, each group 14 is formed of twelve articles. This means that the bar 12 remains in the operative position exactly the time necessary for three groups of articles such as 7, 8 to be united into a group 14, after which the cycle of operations is resumed to form a fresh group 14 with three groups such as 7, 8. It will be seen that in this way, the time available to ensure the transfer of the articles from the intermediate conveyor 15 to the final conveyor 10 is considerably lengthened relative to what it would be if one treated directly the groups such as 7 and 8. As a matter of fact, the additional time arises from the temporary stopping of the articles 2 by the bar 12 to form the groups 14. During all this stopping period, one may operate on the articles 2 of the preceding group 14. In order to clarify what has been stated, one will now describe how this transfer from the conveyor 15 to the conveyor 10 is effected.

To the conveyor 15 is imparted a very appreciably higher speed than that of the conveyor 1 and it delivers the articles which it has received on to another auxiliary conveyor 16 which is constituted as follows. For each row 3, 4, 5, 6 of articles the conveyor 16 comprises a pair of transmission belts such as 17, 18 in FIG. 3. Each article 2 thus arrives on a pair of belts 17, 18 which move at the same speed as the conveyor 15. Slightly below the level of the upper part of the belts 17, 18 is disposed a plate 19 hinged at 20. The axis of this hinge is parallel to the direction of movement of the articles, that is to say to the direction of the arrow 21 (FIG. 2). In FIG. 3 are seen two of these plates, but as a matter of fact there are four, that is to say one for each row 3, 4, 5, 6. Each plate 19 has a slot 22 for the passage of the belts 17, 18 and of certain of the pulleys over which pass said belts. Each plate 19 oscillates between the horizontal position shown in full lines in FIG. 3 and an inclined position indicated in dot and dash lines in this same figure. The control of the movement of the plates 19 is obviously synchronized with the operation of the installation as a whole, so as to obtain the following result. As soon as one group or more exactly as soon as four groups 14 of articles have arrived on the conveyor 16, they are immobilized by a stop 23 provided on each of the plates 19. Then these plates oscillate from the position shown in full lines to the position shown in dot and dash lines, which has for result to raise first of all these articles above the conveyor, that is to say above the belts 17, 18, then to cause these articles to slide obliquely on to the final conveyor 10 which drives them in the direction of the arrow 11. Each group 14 corresponding to the rows 3, 4, 5, 6 thus settles in the form of a separate group on the conveyor 10. In other words, the four groups of twelve articles settle simultaneously on the conveyor 10 in the form of four parallel groups as seen in FIG. 1. As from then, the articles are presented in a suitable manner so as to be directed towards a folding machine, through the agency of a distributor, as is well known.

As has been explained above, in view of the intervention of the stop member 12, the time available for the rocking movement of the plates 19 and for the transfer of the articles 2, from said plates to the conveyor 10, is amply sufficient to permit said movement and said transfer as well as the return of the plates 19 to the horizontal position before a fresh series of articles 2 is brought on to the conveyor 16.

In FIG. 4 there is shown very diagrammatically a variant of the device which has just been described. At 1a is seen the first conveyor, at 10a the second conveyor which is shown in dot and dash lines. At 15a is shown the auxiliary conveyor which corresponds to 15 in FIG. 1 and at 16a the conveyor which corresponds to 16 in FIG. 1. In the variant according to FIG. 4, instead of having a rectilinear conveyor 10a as in the first example, one has to deal with a curved lineal conveyor 24 followed by a rectilinear lineal conveyor 10b the direction of which is parallel to that of 1a, 15a and 16a (whereas 10a is perpendicular to 1a). Conveyors of curved shape such as 24 are well known and a detailed description thereof will therefore be dispensed with.

It will be noted that in FIG. 3, when the rocking plate 19 is in the inclined position (dot and dash lines), its lower end constitutes a stop for the adjoining article 2. In other words, the lower end of the plate 19 to the left constitutes a stop for the article 2 to the right which is thus prevented during its sliding movement to the left, from proceeding beyond the lowest part of the plate 19. Thus, the correct position of the articles 2 on the conveyor 10 is ensured.

What is claimed is:

1. Device for transferring flat articles of general rectangular shape, from a first linear conveyor on to a second one, where, on the first, these articles are spaced apart and placed parallel to each other in the form of several longitudinal rows with their small sides parallel to the direction of movement, whereas on the second conveyor, these articles have their long sides parallel to the direction of movement of said second conveyor, comprising means for temporarily stopping the articles on the first conveyor, so as to oblige the articles on each row to huddle together to form a compact group, and means for raising individually each of said group above the first conveyor and then to cause it to slide on to the second, parallel to the longitudinal direction of said articles.

2. Device according to claim 1, wherein said means for raising each group of articles is a pivoting plate oscillating between a horizontal position below the upper surface of the first conveyor, and an inclined position, in which the greater part of said plate is above said upper surface, the various plates being disposed above the second conveyor, so that the articles slide under the action of gravity from said inclined plates on to the second conveyor.

3. Device according to claim 1, wherein the first conveyor is formed of three sections, a first section on the fore part of which is disposed said temporary stop means, a second section following the latter, to receive the articles huddled together, said second section having a transport speed higher than that of the first one, and a third section, placed where the above mentioned means are located, for raising the articles brought on to it by the second section.

4. Device according to claim 3, wherein the third section of the first conveyor is formed of pairs of belts equal in number to that of the longitudinal rows of articles, the belts of each pair being spaced apart so as to leave between them the necessary space for the passage of the above mentioned plate when it oscillates.

References Cited

UNITED STATES PATENTS 3,224,549   12/1965   Cella _____ 198—34 X

EDWARD A. SROKA, Primary Examiner

U.S. Cl. X.R.

53—159